United States Patent Office 3,391,212
Patented July 2, 1968

---

3,391,212
PROCESS FOR THE PREPARATION
OF OLEFINS
John P. Napolitano and Rex D. Closson, Royal Oak,
Mich., assignors to Ethyl Corporation, New York, N.Y.,
a corporation of Virginia
No Drawing. Filed Oct. 10, 1966, Ser. No. 585,297
9 Claims. (Cl. 260—677)

This invention is directed to a process for preparing olefins. The process involves an exchange reaction carried out in the presence of an alkanol and a small catalytic quantity of a mineral acid. The reaction is illustrated by the following equation.

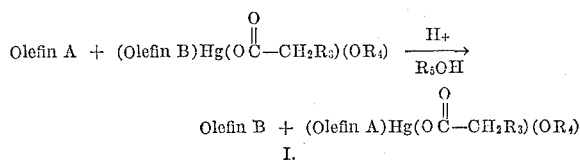

$R_3$, $R_4$ and $R_5$ are defined below.

It is well known that an olefine will add to basic, alkoxy and normal organic acid salts of mercury to form a complex. Thus, for example, ethylene is rapidly absorbed by a solution of mercuric acetate in glacial acetic acid according to the following reaction.

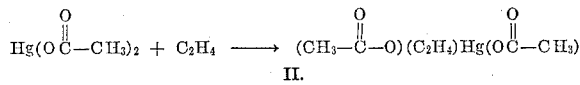

Where an alcohol is used as a solvent, the alcohol may take part in the reaction. For example, where the reaction is ethylene with mercuric acetate takes place in methanol, a product is obtained according to the following equation.

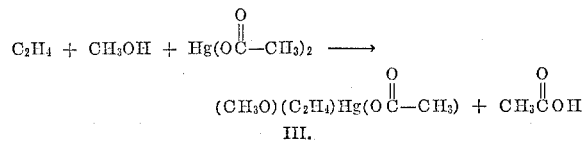

The preparation of these mercuric complexes, their proposed structures, and the reactions they undergo are summarized in an article by J. Chatt, entitled, "The Addition Compounds of Olefins With Mercuric Salts," Chem. Reviews, vol. 48, pages 7–42 (1951).

It has been discovered that quite unexpectedly an olefin alkoxy mercuric salt complex of the type

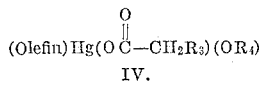

will react with different olefin in the presence of an alcohol and a catalytic quantity of a strong mineral acid. As illustrated in Equation I above, olefin B is thereby displaced by olefin A.

An embodiment of this invention is a process for the preparation of an olefin, said process comprising reacting a mercury complex having the formula

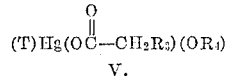

wherein (T) is a radical derived from an olefin T having the formula

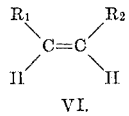

wherein $R_1$ and $R_2$ are selected from the class consisting of hydrogen and alkyl radicals of up to about 20 carbon atoms such that the total number of carbon atoms in said olefin is up to about 22 carbon atoms and $R_3$ and $R_4$ are independently selected from the group consisting of hydrogen and alkyl radicals having 1 to about 6 carbon atoms, with an olefin $T_1$, which is different from T and having the formula

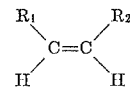

wherein $R_1$ and $R_2$ have the same significance as above, said process being carried out at from about 15° C. to about 100° C. and in the presence of (a) an alcohol having the formula $R_5$—OH wherein $R_5$ is an alkyl radical having 1 to about 6 carbon atoms and (b) and a catalytic quantity of a mineral acid.

Olefins which are useful in the practice if this invention are unsaturated hydrocarbons having at least one carbon to carbon double bond. In general, alkenes having from 2 to about 24 carbon atoms are useful. The olefin may be an internal olefin, that is, one having a carbon-to-carbon bond in a non-terminal position. Examples of useful internal olefins are butene-2,2,2-dimethyl pentene-2, eicosene-4, decene-3, 1,3-pentadiene, 2,6,8-octadecatriene, and the like. Terminal olefins, that is, olefins in which at least one of the carbon-to-carbon double bonds is in a 1,2-position in the molecule are also useful. Examples of this type of olefin are 4,4-dimethylpentene-1, triisobutylene, eicosene-1, 2-ethylhexene-1, and the like. Olefins which are useful in this process may also be cyclic, such as cyclohexene, cyclopentadiene, and the like. Olefins having aromatic substituents, such as styrene and the like, are also useful. The preferred olefins are straight chain monoolefins having 2 to about 20 carbon atoms. Examples of these preferred olefins are ethylene, dodecene-1, hexadecene-1, octadecene-1, butene-2, undecene-4, nonadecene-3 and the like.

The mercuric complexes which are useful in this invention are those represented by Formula V. As pointed out above, these mercuric complexes are readily prepared by treating a suitable mercuric salt with an olefin in the presence of an alcohol. If desired the complex made in this manner can be separated by conventional means. For example, if the complex formed is insoluble, it may be separated by filtration. On the other hand if the complex is soluble, the solvent may be evaporated. The complex may also be used in the solution in which it is prepared.

These mercuric complexes are more easily described in terms of the reactants used in their preparation, i.e., the olefin, the alcohol and the mercuric salts. Suitable reactant complexes are made from olefins such as those disclosed above. The mercuric salts which are used to prepare useful reactant complexes are the normal salts of carboxylic acids having 1 to about 6 carbon atoms. Examples of useful mercuric salts are mercuric hexanoate, mercuric 2-methylpentanoate, mercuric benzoate, mercuric sorbate, mercuric butyrate and the like. Preferred mercuric salts are salts of the lower alkanoic acid. Examples of these preferred salts are mercuric acetate, mercuric propionate and the like.

The alcohols which are used in making useful reactant complexes having Formula V are the alkanols having up to about 6 carbon atoms. The alcohols may be tertiary, such as tert-butanol, 1,1-dimethyl-n-butanol and the like. Secondary alcohols such as sec-butanol, 3-hexanol, 2-propanol and the like are also useful. Primary alcohols are preferred. Examples of primary alcohols which are useful are 1-hexanol, 2-methylbutanol-1, 1-butanol and the like. The primary lower alcohols such as ethanol, n-propanol, and n-butanol are more preferred. Methanol is most preferred.

Procedures for preparing the reactant complexes of Formula V are known and found in the literature. Typically, the preparation is readily effected by mixing the mercuric salt, the alcohol, and olefin and heating this mixture, at reflux. The time of reaction will depend on the conversion desired and the relative reactivity of the ingredients used. Where the olefin is a gas or has a high vapor pressure at room temperature, the reaction can conveniently be carried out under pressure.

Although the reaction of an olefin with a mercuric salt of an organic acid and an alcohol is old in the art, the mechanism of the reaction has not been satisfactorily explained. Two mechanisms for the reaction are currently proposed. The structural formulae for the complexes obtained by these mechanisms are illustrated below; (starting materials are methanol, mercuric acetate and ethylene).

Product of Mechanism 1

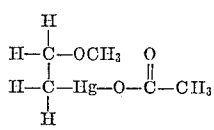

Product of Mechanism 2

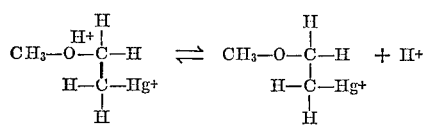

These structures and the mechanisms on which they are based are discussed in detail in the Chatt article cited above. Since the exact structure of the complex has not yet been established, the complex is represented best by the quasi-structural illustration presented by Formula V. This formula is used with approval by Chatt in the reference cited above as well as by others.

The reactant complex having Formula V can also be identified as the complex product obtained by reacting an alcohol, an olefin and a mercuric salt of an organic acid (each as herein defined) in approximately equimolar quantities, at temperatures of from about 10° C. to about 150° C. and for from about 15 minutes to about 72 hours. The mercuric salt-alkoxy-olefin complex obtained by this general process or by a suitable process available in the art can be used in the process of the present invention. This reactant complex is defined by Formula V.

The process of this invention is carried out in the presence of an alcohol and is catalyzed by a small amount of a strong mineral acid. The alcohols which are useful in this process are in general the same as those which have been described above. The primary alcohols are preferred; methanol is the most preferred alcohol. It is not required that the alcohol reaction medium and the alcohol used to prepare the mercuric complex of Formula V be the same. That is, an olefin methoxy mercuric acetate complex will react with another olefin in n-butanol containing a mineral acid catalyst.

The alcohol may be present in excess and serve as the reaction medium. On the other hand, the reaction of this invention will also proceed in the presence of lesser amounts of alcohol. Mixtures of alcohols are also useful; mixtures of alcohols and other media such as ligroin, dodecane and the like are also effective. Although the mechanism of the reaction is not fully understood, it is believed that the alcohol acts as an activator. Thus, the process of this invention can be carried out in the presence of from about 0.1 to about 1,000 parts of alcohol.

The acids which catalyze the reaction of Equation I are strong acids. Mineral acids are generally preferred. Examples of these acids are phosphoric acid, polyphosphoric acid, the hydrogen halide acids such as hydrochloric acid, hydrobromic acid and the like, and sulfuric acid. Sulfuric acid is the most preferred of the mineral acids.

The reaction involved in the process of this invention requires that both the alcohol and the acid be present. It is well known (see Chatt reference cited above) that the olefin alkoxy mercuric salt complex is decomposed by adding a halogen acid to a solution of this complex. It is quite remarkable then in light of this action of halogen acid that in the presence of an alkanol and another olefin decomposition does not occur; rather, the olefin in the complex is displaced by another olefin. As will be shown in the examples below, treating an alcohol solution of the mercuric complex with another olefin will not result in a displacement; nor will the olefin mercuric complex in non-alcoholic solution when treated with another olefin without addition of a catalytic quantity of strong acid, undergo the displacement reaction.

In carrying out the process of this invention, the acid is present in small quantities sufficient to catalyze the reaction. Amounts of acid from about 0.0000001 to about 10.0 percent by weight are generally used.

The process is carried out over a wide range of olefin to olefin alkoxy mercuric salt complex concentrations. The molar ratio of olefin to olefin alkoxy mercuric salt complex may range from 0.1/1 to 1/0.1. The reaction is generally carried out in the presence of an excess of olefin. The most productive ratio would be determined by other factors such as physical state of the olefin, the rate of reaction, the temperature, and similar considerations.

The alcohol necessary for the reaction is present in an amount from 1 to about 100 times the amount of olefin alkoxy mercuric salt complex present. The alcohol also acts as a solvent for the olefin alkoxy mercuric salt complex reactant.

The process of the present invention is conducted at temperatures of from about 15° C. to about 100° C. Reaction temperatures above and below this range are also useful.

The reaction may proceed at atmospheric pressure as well as at pressures other than atmospheric. Where the reaction is to be carried out above the boiling point of the reaction mixture, the reaction can be carried out at pressures above atmospheric. This will minimize loss of volatile ingredients.

The examples which follow, demonstrate how the process is carried out. The examples include the preparation of the olefin alkoxy mercuric salt complex reactants which are used in the process of this invention. All parts are by weight unless otherwise noted.

Example 1

A reaction vessel equipped with stirrer, condenser and dropping funnel was charged with 95.5 parts of mercuric acetate and 118.8 parts of absolute methanol. To this mixture was added 50.5 parts of hexene-1, the temperature being maintained at 60° C. After the hexene-1 addition was complete, the mixture was stirred for an additional 90 minutes at a temperature of 57° C. The reaction was conducted under a blanket of nitrogen.

At the end of this time the solvent was evaporated. The product remaining was liquid hexene-1 methoxy mercuric acetate complex corresponding to the formula $(C_6H_{12})(CH_3O)Hg(OCOCH_3)$. Elemental analysis of the product gave the following result: Found: C=28.9 percent, H=4.95 percent, Hg=51.7 percent. Theory: C=28.84 percent, H=4.83 percent, Hg=53.5 percent. The amount of product obtained was 112.3 parts.

Analogous dodecene-1 and ethylene complexes were prepared in a similar manner.

Utilizing a similar procedure,

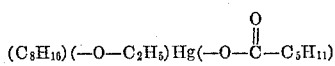

is prepared from diisobutylene, ethanol and mercuric hexanoate;

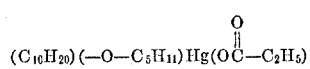

from decene-3, pentanol-2 and mercuric propionate;

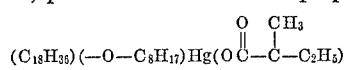

from octadecene-1, n-octanol and mercuric 2-methylbutyrate.

Example 2

A vessel equipped with a stirrer, condenser and thermometer was charged with 11.26 parts of the hexene-1 methoxy mercuric acetate complex of Example 1, 10 parts of methanol and 5.5 parts of dodecene-1. To this mixture was added 0.0000008 part of sulfuric acid. This mixture was heated at reflux for 1½ hours. At the end of this time a sample of the reaction mixture was examined by gas chromatography. It was found that 40.7 percent of the hexene-1 had exchanged with dodecene-1.

At this point, 0.0481 part of sulfuric acid was added and the mixture was refluxed for 90 minutes more. Analysis of the product by gas chromatography showed that 68.3 percent of the hexene-1 had been liberated.

The reaction was conducted under a nitrogen blanket.

Example 3

A vessel fitted with stirrer, condenser and thermometer was charged with 30.57 parts of ethylene methoxy mercuric acetate complex, a white solid, 16.8 parts of dodecene-1, 11.4 parts of octane, and 0.0481 part of sulfuric acid. The mixture was heated to 60° C., at which point the white solid complex melted. The reaction mass was further heated to 84° C. No ethylene evolution could be detected.

Example 4

The mixture of Example 3 was cooled to 40° C. and 32 parts of methanol was added. The mixture was heated to reflux temperature (64° C.). A rapid gas evolution was observed. The reaction mass was further refluxed for eight hours. A sample of the reaction mixture was examined by gas chromatography. It was found that 50 percent of the ethylene in the ethylene methoxy mercuric acetate complex had been displaced by dodecene-1.

Example 5

A vessel equipped as in Example 2 was charged with 10 parts of dodecene-1 methoxy mercuric acetate complex (containing about 3.34 parts of absorbed dodecane) and 7.9 parts of methanol. This mixture was refluxed for 30 minutes. Examination of the mixture by gas chromatography showed that no dodecene-1 had been displaced.

Example 6

To the reaction mixture of Example 5 was added 1.83 parts of sulfuric acid. The mixture was again refluxed for 30 minutes. Examination by gas chromatography showed that no dodecene-1 had been displaced.

Example 7

The reaction mixture of Example 6 was cooled and two parts of hexene-1 were added. The mixture was refluxed for two hours and thirty minutes. Examination by gas chromatography showed that approximately 75 percent of the dodecene-1 had been displaced by hexene-1.

Example 8

A vessel fitted as in the example above is charged with 5 parts of eicosene-1 butoxy mercuric hexanoate complex, 20 parts of pentene-2, 10 parts of ethanol, and 0.0001 part of phosphoric acid. The mixture is heated at refluxed for 16 hours. Eicosene-1 is recovered as the product.

Example 9

To a vessel fitted with condenser, stirrer and thermometer are charged 10 parts of propene decoxy mercuric isobutyrate complex, 25 parts of octene-1, 20 parts of 2-octanol and 0.001 parts polyphosphoric acid. The mixture is refluxed for six hours. The product obtained is propene.

Example 10

A vessel fitted as in the above examples is charged with 5 parts of nonene-3 propoxy mercuric propionate, 15 parts of octadecene-8, 20 parts of n-decanol and 2.04 parts hydrochloric acid. The mixture is refluxed for six hours. The product obtained in good yield is nonene-3.

In the examples presented above, it is distinctly shown that displacement of the olefin in the reactant olefin complex with a second olefin will take place only in the presence of an alcohol and a catalytic amount of a strong acid. Example 3 shows that no displacement occurs when dodecene-1 is added to an ethylene methoxy mercuric acetate complex in octane with sulfuric acid catalyst even after refluxing for 30 minutes. By adding methanol to the Example 3 mixture, dodecene-1 replaces the ethylene in the complex (Example 4). Example 6 shows that the dodecene-1 methoxy mercuric acetate complex in methanol containing a small portion of sulfuric acid does not liberate dodecene-1 even after refluxing for thirty minutes. This same mixture, however, does react to yield dodecene-1 when hexene-1 is added and the solution is refluxed (Example 7). Thus, although the theoretical basis for the reaction is not determined, it is quite apparent that an olefin, different from that in the mercuric complex, an alkanol, and a catalytic quantity of strong acid are required for displacing the olefin in an olefin alkoxy mercuric salt complex having Formula V.

It is further noted that in Example 2 the displacement reaction may be activated by adding an additional amount of the catalyst acid. This then is another embodiment of this invention.

Besides providing a process for preparing olefins, it is clear that an olefin-alkoxy-mercuric salt complex is also prepared during the course of the reaction. This is readily seen from Equation I illustrating the reaction. Thus, the process of this invention may also be viewed as the preparation of an olefin alkoxy mercuric salt complex.

There are many uses for the olefin products of the process of this invention. For example, the olefin may be hydrogenated to yield the corresponding paraffin; the olefin may be treated with HCl to yield an alkyl halide; olefins are useful intermediates in preparing polymers such as polyethylene, polypropylene and the like.

The process of the present invention has been fully described. The scope of the invention is limited only to the lawful extent of the claims which follow.

We claim:

1. A process for the preparation of an olefin, said process comprising reacting a mercury complex having the formula

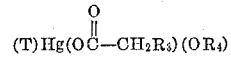

wherein (T) is a radical derived from an olefin T having the formula

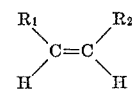

wherein $R_1$ and $R_2$ are selected from the class consisting of hydrogen and alkyl radicals of up to about 20 carbon atoms such that the total number of carbon atoms in said olefin is up to about 22 carbon atoms and $R_3$ and $R_4$ are independently selected from the group consisting of hydrogen and alkyl radicals having 1 to about 6 carbon atoms, with an olefin $T_1$, which is different from T and having the formula

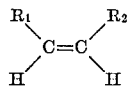

wherein $R_1$ and $R_2$ have the same significance as above, said process being carried out at from about 15° C. to about 100° C., in the presence of
- (a) an alcohol having the formula $R_5$—OH wherein $R_5$ is an alkyl radical having 1 to about 6 carbon atoms and
- (b) a catalytic quantity of a mineral acid.

2. The process of claim 1 wherein the mineral acid is present in an amount of from about 0.0000001 to about 10.0 percent by weight.

3. The process of claim 2 wherein $R_2$ is hydrogen.

4. The process of claim 2 wherein $R_3$ is hydrogen.

5. The process of claim 2 wherein the alcohol is selected from the group consisting of methanol, ethanol and isopropanol.

6. The process of claim 2 wherein the mineral acid is selected from the group consisting of sulfuric acid, phosphoric acid and hydrochloric acid.

7. The process of claim 6 wherein T is dodecene-1, $R_3$ is hydrogen, $R_4$ is a methyl radical, $T_1$ is hexene-1, said alcohol is methanol and said mineral acid is sulfuric acid.

8. The process of claim 6 wherein T is hexene-1 and $T_1$ is dodecene-1.

9. The process of claim 6 wherein T is ethylene.

References Cited
UNITED STATES PATENTS

| | | | |
|---|---|---|---|
| 2,953,611 | 9/1960 | Spengler | 260—677 |
| 3,294,830 | 12/1966 | Horvitz et al. | 260—431 |

PAUL M. COUGHLAN, JR., *Primary Examiner.*